United States Patent Office 3,446,789
Patented May 27, 1969

3,446,789
ANALOGUES OF CYCLIC PEPTIDES CONTAINING DISULFIDE BONDS WITHOUT DISULFIDE BONDS
Josef Rudinger and Karel Jost, Prague, Czechoslovakia, assignors to Ceskoslovenska Akademie Ved, Prague, Czechoslovakia
No Drawing. Filed July 30, 1965, Ser. No. 476,162
Int. Cl. C07c *103/52;* A61k *17/00, 25/00*
U.S. Cl. 260—112.5                         3 Claims

ABSTRACT OF THE DISCLOSURE

A cyclic derivative of a peptide of the formula

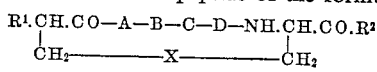

in which A, B, C, D are L-amino acid residues, $R^1$ is H or $NH_2$ or $NH_2$ substituted by a protective group and wherein $R^2$ is OH or $NH_2$ or one of these two radicals substituted with a protective group and wherein X is $CH_2S$ or $CH_2CH_2$.

An example is deamino-carba$^1$-oxytocin.

The compounds are formed by reacting a non-cyclic peptide containing a group X, as defined above, with a peptide bonds-forming agent such as dicyclohexylcarbodiimide, sec. butylchloroformate or N-ethyl-5-phenyloxazolium-3'-sulfonate.

---

This invention concerns cyclic peptide derivatives and analogues of natural hormones of the oxytocin, vasopressin and insulin type and a method of making these compounds. These compounds of the invention have the general formula

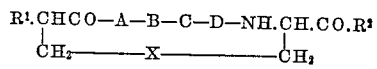

where A, B, C, D are L-alpha-amino acid residues, $R^1$ is H or $NH_2$ or a substituted $NH_2$ group, the substituent being a protective group such as benzyloxycarboxyl, tertiary butyloxycarbonyl, o-nitrophenylsulfenyl, tosyl, formyl, etc., or an L-alpha-amino acid residue or a peptide chain containing 2 to 6 L-alpha-amino acids, or a residue of L-alpha-amino acids substituted by a protective group as indicated before and wherein $R^2$ is OH or $NH_2$, or $NH_2$ substituted by an L-alpha-amino acid residue or peptide chain, which latter may include a protective group as indicated and wherein X is $CH_2S$, $CH_2CH_2$, $CH_2NH$, $CH_2O$, NHNH or CONH.

The prior art substances generally are of the type

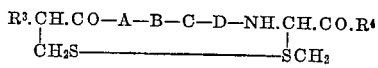

where A, B, C, D have the same significance as above $R^3$ is H or an amino acid or a peptide residue attached through the carboxyl end, and $R^4$ is a peptide chain attached through the amino end. These substances occur in mammals as hormones, such as oxytocin, vasopressin, vasotocin, isotocin and insulin. These hormones, whether isolated from natural sources or prepared synthetically (oxytocin, vasopressins) are in broad pharmacological use. Such use has also been made of some of the synthetic analogues of these hormones derived from the structure of the natural hormones by substituting functional groups, such as substitution of certain amino acid residues by other groups.

All of these substances, either natural or synthetic, contain a disulfide bridge between cystines as part of a twenty-membered ring. This type of structure has only limited stability (Heston G. S., Rydon, N. H., Schofield, J. A.: J. Chem. Soc., 1956, 3157). Formation of the disulfide bridge, which in all previous synthetic approaches has been the last step, results in a low yield; see Du Vigneaud, V., et al.: J. Am. Chem. Soc., 76, 3115 (1954); Boissonas, R. A., Polypeptides Which Affect Smooth Muscles and Blood Vessels, ed. M. Schachter, Pergamon Press, 1960, pp. 7–19; Rudinger, J., Horzl, J., Zaoral, M., Coll. Czechoslov. Chem. Commun. 21, 202 (1956), Chem. listy, 50, 288 (1956). This limitation applies in particular to the insulin synthesis in the last stage (Meienhofer, Jr., et al., Z. Naturforsch., 18, 1120 (1963); Katsoyannis, P. G., Tomotako, A., Fukuda, K., J. Am. Chem. Soc., 85, 2863 (1963). This has been the main obstacle to practical application of chemical synthesis in this area. Moreover, the disulfide group per se is relatively unstable both chemically (Rossler, C., Science, 128, 1281 (1958), and metabolically (Rychlik, I., Oxytocin, Vasopressin and the Structural Analogues, Proc. Second Internat Pharmacol. Meeting, Pergamon Press, 1964, pp. 153–162; Tomizava, R. R., J. Biol. Chem., 237, 3393 (1962), and reaction at this site is the main reason for loss of activity of these hormones. The same applies to all known synthetic analogues with biological activity.

It has also been generally assumed that the presence of the disulfide group in a ring of this size is necessary for the existence of the biological activity of these hormones (Jarvis D., Du Vigneaud, V., Science, 143, 543 (1964). Thus the theories of the mechanism of action of these substances are usually based on the reactivity of the SS group. In other words, if the disulfied group was omitted to avoid the difficulties associated with this group during synthesis, one would and did expect a loss of activity.

It is an object, therefore, of the present invention, to avoid the instability resulting from the SS group in the synthesis of cyclic peptides of the structure indicated.

It is a further object to provide for synthetically formed or modified cyclic peptides which retain their biological activity in spite of the absence of the SS group.

It is still another object to produce synthetically or by part-synthesis the above identified compounds with a substantially better yield than heretofore possible.

These and other objects will be apparent from the following description of the invention.

The inventors have found that compounds in which the disulfide bridge is replaced by other chemical groups, retain the biological activity which is characteristic of the parent molecule.

The present invention therefore is directed to cyclic compounds and their formation from non-cyclical peptides or their derivatives which cyclic compounds contain as the group designated X in the above formula one of the following groups: $CH_2S$, $CH_2CH_2$, $CH_2NH$, $CH_2O$, NHNH or CONH. The reagents used for peptide bond formation are e.g. dicyclohexylcarbodiimide, sec. butylchloroformate, and N-ethyl-5-phenylisoxazolium-3'-sulfonate. The compounds prepared, e.g., by the procedure described below, have a biological activity similar to that of the peptides with a disulfide bridge. Moreover, they have a higher degree of chemical stability, they can be stored in the solid state, can be prepared in solution with a wider pH range, and can be sterilized. These substances can be combined in pharmaceutical preparations with the same reducing agents that react with disulfide bonds. Substitution of a disulfide bond by a group X, as defined, also increases the synthetic yield, particularly in the synthesis of substances with more than one SS group, where replacement of one disulfide by the group X does not interfere with the formation of other disulfide bridges in the same molecule.

EXAMPLE 1

The amide of benzyloxycarbonyl-tyrosyl-isoleucyl- glutaminyl-asparaginyl - S - benzyl-cysteinyl-prolyl-leucyl-glycine To a solution of the hydrazide of benzyloxycarbonyl-tyrosine (1.0 gr.) in a mixture of tetrahydrofuran (10 ml.) and azeotropic HCl (1.5 ml.), cooled to −15° C., was added with constant mixing 0.90 ml. of 3.75 M $NaNO_2$ in water. After ten minutes at the same temperature the reaction mixture was diluted with 40 ml. of pre-cooled (−15° C.) ethylacetate and was shaken up with a 3% solution of $NaHCO_3$ in aqueous NaCl. After drying in aqueous NaCl. After drying in the usual manner with $Na_2SO_4$ the solution of azide was added to the solution of 2.5 gr. of the amide of isoleucyl-glutaminyl-asparaginyl-S-benzylcysteinyl-prolyl-leucyl-glycine in 80 ml. of dimethylformamide. After twelve hours at 0° C. the reaction mixture was evaporated in vacuo, the dried powder shaken up with dilute HCl, filtered and washed with dilute HCl and water. Crystallization from the aqueous solution of dimethylformamide yielded 2.49 gr. (80%) of the product (M.P. 214–217° C.). For analysis the sample was recrystallized twice in the same manner with no change in the M.P. and gave the following analytical results for the hemihydrate. — $C_{55}H_{75}N_1O_{13}S \cdot O.5H_2O$ (1140.3) calculated: C, 57.95%; H, 6.72%; N, 13.52%. Found: C, 57.99%; H, 6.81%; N, 13.47%.

EXAMPLE 2

Tertiary butyl ester of gamma-iodobutyric acid

To a solution of 48 gr. of gamma-iodobutric acid in tert.-butyl acetate (900 ml.) was added 3.6 ml. of 70% perchloric acid. After 3 days at room temperature the reaction mixture was shaken with a 5% solution of sodium carbonate and dried with sodium sulfate. The tert.-butyl acetate was distilled off in vacuum in a current of nitrogen. The product was distilled under $N_2$. The yield was 32 gr. (42%) with a B.P. of 95–100° C./5 mm., $n_D^{20}$ 1.4840. $C_8H_{15}IO_2$ (270.1) calculated: C, 35.57%; H, 5.60%; I, 46.98%. Found: C, 35.47%; H, 5.50%; I, 46.86%.

EXAMPLE 3

The amide of tyrosyl-isoleucyl-glutaminyl-asparaginyl-S-(3-carboxypropyl)-cysteinyl-prolyl-leucyl-glycine 1.71 gr. of benzyloxycarbonyl-octapeptide amide were dissolved in liquid ammonia (150 ml. distilled over Na) and sodium was added in small pieces until a deep purple color lasted 8 min. After decoloration with ammonium chloride the tertiary butyl ester of gamma-iodobutyric acid (1.14 gr.) was added to the reaction mixture, the solution was concentrated to a small volume and lyophilized. The lyophilisate was dissolved in water, and pH was adjusted to 6–6.5 with 1 N HCl, and and semi-solid oil was spread with water until crystals formed. After filtering, the latter were washed with water and ether. The yield was 0.65 gr.

This unpurified ester was dissolved in trifluoracetic acid (20 ml) and after 2 hrs. at room temperature the reaction mixture was evaporated in vacuum. The dry powder was dissolved in 10% ethyl alcohol and filtered through a column of sulfonate ion exchanger (Zerolite 225 in the $H^+$ cycle). The column was washed with water to a neutral pH and the product was eluted with 10% pyridine. The later eluate was then concentrated to a small volume and lyophilized, and the resulting product was chromatographed on a column of Dowex 1 x 2 (200–400 mesh, pyridine-acetate cycle) using gradient elution (1% pyridine-2% acetic acid). The product was washed from the column at a pH of about 5.5 and lyophilized with a yield of 0.14 gr. The sample for analysis was precipitated from a mixture of methyl alcohol-ether, and had a melting point of 145–147° C. $C_{44}H_{69}N_{11}O_{13}S \cdot 2H_2O$ (1028.1) calculated: C, 51.41%; H, 7.16%; N, 14.99%. Found: C, 51.48%; H, 7.33%; N, 14.64%. Amino acid composition: Asp 0.97, Cys [$(CH_2)_3CO_2H$] 0.83, Glu 0.94, Gly 0.80, Ile 1.04, Leu 1.00, Pro 0.86, Tyr 0.91.

The product was electrophoretically and chromatographically homogeneous.

EXAMPLE 4

The lactam of tryosyl-isoleucyl-glutaminyl-asparaginyl-S-(3 - carboxypropyl) - cysteinyl-prolyl-leucyl-glycine amide (Deamino-carbal-oxytocin)

(a) Ring formation using Woodward reagent K.—To a solution of 54.4 mg. acyclopeptide in 8 ml. of dimethylformamide at 0° C. was added, with stirring, N-ethyl-5-phenyl-isoxazolium-3'-sulfonate (Woodward reagent K) (13.2 mg.). After 2 hrs. at 0° C. the reaction mixture was diluted with 8 ml. dimethylformamide and 5.85 mg. of N-ethylpiperidine were added. After 9 days of mixing at room temperature the reaction mixture was dried, and the powder disolved in 5 ml. water and filtered gradually through a column of Dowex 50, Amberlit IR–4B and Zerolit 225. The eluate was concentrated and lyophylized, yielding 16.6 mg. of product, homogeneous electrophoretically and chromatographically (negative ninhydrin reaction, positive Pauly and iodoplatinate reactions) containing 80% of peptide material on N analysis. Amino acid analysis: Asp 1.10, Cys [$(CH_2)_3COOM$] 0.70, Glu 0.90, Gly 1.00, Ile 0.95, Leu 1.04, Pro 1.00, Tyr 0.70. Biological activity: oxytocic activity on the rat uterus in vitro 60 units/mg.; vasodepressor activity: 25 units/mg., antidiuretic activity in intact alcohol-treated rats—1 unit/mg.

(b) Ring formation by the anhydride method.—To a solution of 13.1 mg. of acyclopeptide in 1.5 ml. dimethylformamide at −15° C. was added 1.82 mg. of sec-butyl chloroformate. After 10 min. at −15° C. the reaction mixture was heated to 2° C., diluted with 2 ml. dimethylformamide and neutralized with N-ethylpiperidine (1.50 mg). After 24 hours at room temperature the reaction mixture was evaporated in vacuo and the powder disolved in water and then reprocessed by the same technique as under (a) above. The yield was 4.5 mg. of a product which was homogeneous electrophoretically and chromatographically, with identical properties as under (a) above.

EXAMPLE 5

The tert. butyl-ester of alpha-tosylamino-gamma-chlorobutyric acid

To a solution of alpha-tosyl-L-alpha, gamma-diaminobutyric acid (5.5 mg.) in azeotropic HCl (100 ml.), warmed to 80° C. we added sodium nitrite (40 gr.) over a period of 5 min. The reaction mixture was allowed to cool to room temperature and was shaken up with ether and the ether layer was washed with 5% perchloric acid and water, and dried with sodium sulfate, the ether being extracted in vacuo. The residue was dissolved in 100 ml. of tert.-butylacetate, acidified with 70% perchloric acid and the reaction mixture was left for 3 days at room temperature. After washing with 5% $NaHCO_3$ and drying with $Na_2SO_4$ the reaction mixture was evaporated in vacuo. The power was dissolved in ether and left overnight at 0° C. The crystals of alpha-tosylamino-butyrolactone were filtered out (M.P. 136–138° C.). $C_{11}H_{13}NO_4S$ (255.3) calculated: C, 51.77%; H, 5.13%; N, 5.49%. Found: C, 51.71%; H, 5.22%; N, 5.48.

The ether solution was dried in vacuo and the resulting powder crystallized from aqueous ethanol, leaving 0.76 gr. of M.P. 85–90° C. The sample for analysis was recrystallized twice in the same manner resulting in a M.P. of 81–83° C. $C_{15}H_{22}NO_4SCl$ (347.9) calculated: C, 51.78%; H, 6.37%; N, 4.03%; S, 9.22%; Cl, 10.19%. Found: C, 51.76%; H, 6.56%; N, 4.25%; S, 8.94%; Cl, 10.39%.

EXAMPLE 6

Tertiary butyl ester of alpha-tosylamino-gamma-iodobutyric acid

The chlorester (1.0 gr.) was converted to an iodoester by boiling in 40 ml. of acetone with NaI (3.0 gr.). After filtering out the precipitated NaCl the acetone was replaced by ether, and the latter solution was cooled to 0° C. and the precipitated alpha-tosylaminobutyrolacetone was filtered out. The ether was removed in vacuo and the powder crystallized from aqueous ethanol. The yield was 0.60 gr. and had a M.P. of 89-92° C. $C_{15}H_{22}NO_4SI$ (439.2) calculated: I, 28.89%. Found: I, 28.64%.

EXAMPLE 7

N-tosyl-carba¹-oxytocin

N - benzyloxycarbonyl-S-benzyl-octapeptide-amide was reduced by Na in liquid ammonia and alkylated in situ with tertiary butyl ester of alpha-tosylamino-gamma-iodobutyric acid as in the case of deamino-carba-oxytocin. The unpurified product was hydrolyzed with trifluoroacetic acid, and the latter was removed with Zerolite 225. The product was purified on a column of Dowex 1 x 2 using gradient elution. The product was homogeneous electrophoretically and chromatographically, and ring formation was carried out with Woodward's reagent K in dimethylformamide solution, as in the case of the deamino-analogue. $C_{51}H_{74}N_{12}O_{14}S_2 \cdot 4H_2O$ (1216.4) calculated: C, 50.37%; H, 6.79%; N, 13.82%. Found: C, 50.60%; H, 6.47%; N, 13.91%.

Reduction by Na in liquid ammonia gave a product with the vasodepressor and antidiuretic activity of oxytocin.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be secured by Letters Patent is:

1. Deamino-carba¹-oxytocin.
2. N-tosyl-carba¹-oxytocin.
3. The amide of tyrosylisoleucyl - glutaminylasparaginyl - S(3-carboxypropyl)-cysteinyl-prolyl-leucyl-glycine, all amino acid radicals in this formula except glycine being derived from L-amino acids.

References Cited

Schwartz et al.: Proc. Natl. Acad. Sci. U.S. 52, 1044–1045 (1964).

LEWIS GOTTS, *Primary Examiner.*

M. M. KASSENOFF, *Assistant Examiner.*

U.S. Cl. X.R.

260—343.6, 470, 487; 424—177